US008040418B2

(12) United States Patent
Murata et al.

(10) Patent No.: US 8,040,418 B2
(45) Date of Patent: Oct. 18, 2011

(54) SOLID STATE IMAGING DEVICE WITH READOUT CONTROL AND OUTPUT CONTROL

(75) Inventors: Takahiko Murata, Osaka (JP); Takumi Yamaguchi, Kyoto (JP); Shigetaka Kasuga, Osaka (JP); Takayoshi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 774 days.

(21) Appl. No.: 12/091,138

(22) PCT Filed: Jul. 11, 2006

(86) PCT No.: PCT/JP2006/313731
§ 371 (c)(1),
(2), (4) Date: Apr. 22, 2008

(87) PCT Pub. No.: WO2007/058000
PCT Pub. Date: May 24, 2007

(65) Prior Publication Data
US 2009/0033780 A1   Feb. 5, 2009

(30) Foreign Application Priority Data
Nov. 16, 2005 (JP) ................. 2005-332208

(51) Int. Cl.
*H04N 3/14* (2006.01)
(52) U.S. Cl. ........................................ 348/323
(58) Field of Classification Search .......... 348/283, 348/321, 323, 308
See application file for complete search history.

(56) References Cited

U.S. PATENT DOCUMENTS
4,985,758 A * 1/1991 Hashimoto ............... 348/283
(Continued)

FOREIGN PATENT DOCUMENTS
JP   8-242345   9/1996
(Continued)

OTHER PUBLICATIONS
English language Abstract of JP 2000-354204.
(Continued)

*Primary Examiner* — Timothy J Henn
*Assistant Examiner* — Gary C Vieaux
(74) *Attorney, Agent, or Firm* — Greenblum & Bernstein, P.L.C.

(57) ABSTRACT

An object of the present invention is to provide a two-dimensional solid state imaging device which can realize speeding up of signal output. The two-dimensional solid state imaging device includes: a pixel region; a first capacitance element and a second capacitance element each of which is arranged for a different column of pixels and accumulates pixel signals of the corresponding column of pixels; a first horizontal signal line and a second horizontal signal line each of which transmits the pixel signals accumulated in a corresponding capacitance element; a common signal line connected to the horizontal signal lines; a scan timing generation unit and a switch unit which control readout of the pixel signals from the capacitance element to the horizontal signal line; and an external output timing unit and a switch unit which select the horizontal signal line and control output of the pixel signals from the selected horizontal signal line to the common signal line. Here, the scan timing generation unit and the switch unit, and the external output timing unit and the switch unit control the readout and the output of the pixel signals, respectively, so that a time period required for the readout of the pixel signals from the capacitance element to the signal line is longer than a time period required for the output of the pixel signals from the signal line to the common signal line.

5 Claims, 12 Drawing Sheets

U.S. PATENT DOCUMENTS

| | | | |
|---|---|---|---|
| 6,388,241 B1 * | 5/2002 | Ang | 250/208.1 |
| 6,539,129 B1 | 3/2003 | Yushiya | |
| 6,747,700 B1 * | 6/2004 | Funakoshi et al. | 348/308 |
| 7,148,927 B2 * | 12/2006 | Ogura et al. | 348/281 |
| 7,242,428 B2 * | 7/2007 | Decker et al. | 348/272 |
| 7,489,357 B2 * | 2/2009 | Nakada | 348/321 |
| 7,508,433 B2 * | 3/2009 | Koseki et al. | 348/300 |
| 2002/0154231 A1 * | 10/2002 | Decker et al. | 348/302 |
| 2003/0234884 A1 * | 12/2003 | Nakada | 348/308 |
| 2005/0062864 A1 * | 3/2005 | Mabuchi | 348/294 |
| 2005/0083420 A1 * | 4/2005 | Koseki et al. | 348/294 |
| 2008/0018770 A1 | 1/2008 | Kato | |
| 2008/0024638 A1 | 1/2008 | Murakami | |
| 2008/0061216 A1 | 3/2008 | Kasuga et al. | |
| 2008/0074527 A1 | 3/2008 | Kato | |
| 2008/0079106 A1 | 4/2008 | Miyagawa et al. | |

FOREIGN PATENT DOCUMENTS

| | | |
|---|---|---|
| JP | 2000-354204 | 12/2000 |
| JP | 2005-143078 | 6/2005 |

OTHER PUBLICATIONS

English language Abstract of JP 2005-143078.

English language Abstract of JP 8-242345.

* cited by examiner

SOLID STATE IMAGING DEVICE WITH READOUT CONTROL AND OUTPUT CONTROL

TECHNICAL FIELD

The present invention relates to solid state imaging devices, and more particularly to a circuit structure of a solid state imaging device which does not need a scan circuit that performs high-speed operation for generating timings of readout of pixel signals from a common signal line during high-speed signal readout.

BACKGROUND ART

In recent years, solid state imaging devices have been used for input units of digital cameras, scanners, and the like, and high-speed image readout has been required for such solid state imaging devices. In order to meet the requirement, for Metal-Oxide-Semiconductor (MOS) solid state imaging devices in which pixels are arranged two-dimensionally in rows and columns (hereinafter, a solid state imaging device in which pixels are arranged two-dimensionally in rows and columns is referred to also as a "two-dimensional solid state imaging device"), various methods have been proposed for increasing operating frequency of a scan circuit which generates timings of readout of pixel signals from a common signal line, or for adapting a multi-output structure having a plurality of outputs, for example. Furthermore, for solid state imaging devices which are used in scanners and include line sensors, methods have been proposed for reading out pixel signals from a plurality of the line sensors by delaying respective drive start cycles of the line sensors, for example.

With reference to FIGS. 1 and 2, the following describes the method for reading out pixel signals from a plurality of the line sensors by delaying respective drive start cycles of the line sensors, which is disclosed in Patent Reference 1.

FIG. 1 is a diagram showing wiring in a contact multi-chip image sensor which is the solid state imaging device of the prior art. In this solid state imaging device, wiring on a substrate 304 in which all line sensors 302-1, 302-2, . . . , 302-15 are formed drives each of the line sensors independently, and signals of each line sensor are provided to an output line corresponding to the line sensor. In more detail, start pulses φSP1 to φSP15 for starting operation of the respective line sensors and clock pulses φCLK1 to φCLK15 for driving the respective line sensors are inputted directly to all of the line sensors 302-1, 302-2, . . . , 302-15, respectively, and output terminals on the substrate 304 from which signals of the respective line sensors are outputted exist according to the number of all of the line sensors 302-1, 302-2, . . . , 302-15 and are connected to output terminals of the line sensors, respectively.

FIG. 2 is a timing chart for explaining operation of the contact multi-chip image sensor of the prior art.

The line sensor 302-1 is driven by the start pulse φSP1 and the clock pulse φCLK1, and signals are outputted from the line sensor 302-1 to an output terminal Vout1 at a timing which is set by the start pulse φSP1 and the clock pulse φCLK1. In the same manner, the line sensor 302-2 is driven by the start pulse φSP2 and the clock pulse φCLK2, and signals are outputted from the line sensor 302-2 to an output terminal Vout2 at a timing which is set by the start pulse φSP2 and the clock pulse φCLK2, and the line sensor 302-15 is driven by the start pulse φSP15 and the clock pulse φCLK15, and signals are outputted from the line sensor 302-15 to an output terminal Vout15 at a timing which is set by the start pulse φSP15 and the clock pulse φCLK15. The start pulses φSP1 to φSP15 and the clock pulses φCLK1 to φCLK15 are delayed respectively by a predetermined time period which is shorter than a time period required for reading out signals from a light-receiving element of the corresponding line sensor, so that, to the output terminals Vout1 to Vout15, signals which are delayed respectively by the respective predetermined time periods are outputted as shown in FIG. 2.

The signals of the output terminals Vout1 to Vout15 are combined in a common signal line A0 to An according to respective timings of pulses φSWW1 to φSWW15, and then transmitted to a signal processing circuit at a latter stage. Here, to the common signal line A0 to An, as shown in FIG. 2, signals of the first pixels of the line sensors 302-1, 302-2, . . . , 302-15 are sequentially outputted during the first pixel period, signals of the second pixels of the line sensors 302-1, 302-2, . . . , 302-15 are sequentially outputted during the second pixel period, and signals of the final pixels of the line sensors 302-1, 302-2, . . . , 302-15 are sequentially outputted during a final pixel period.

Patent Reference 1: Japanese Unexamined Patent Application Publication No. 8-242345.

DISCLOSURE OF INVENTION

Problems that Invention is to Solve

However, in the two-dimensional MOS solid state imaging device of the prior art, when speeding-up of signal output is to be realized by increasing operating frequency of a scan circuit which generates timings of reading out pixel signals from the common signal line and thereby operating the scan circuit at a high speed, satisfactory signal output cannot be obtained and moreover the operation becomes unstable. More specifically, the two-dimensional MOS solid state imaging device of the prior art has a structure in which pixel signals are read out from a plurality of capacitance elements for accumulating the pixel signals to a single common signal line, so that the increase of the operating frequency of the scan circuit needs to increase a speed at which the pixel signals are read out from the capacitance elements to the common signal line. As a result, prior to stabilization of the pixel signals read out from the capacitance elements to the common signal line, output of the pixel signals from the common signal line is started, which fails to obtain signal outputs having fidelity to the pixel signals of the capacitance elements. In addition, a scan circuit is necessary which reads out, at a high speed, pixel signals from all of the capacitance elements to the common signal line, which makes the operation unstable.

Furthermore, in the two-dimensional MOS solid state imaging device of the prior art, when speeding-up of signal output is to be realized by adapting the multi-output structure having a plurality of outputs, the number of processing circuits at the latter stage is increased thereby enlarging a circuit size.

As explained above, the two-dimensional MOS solid state imaging device of the prior art fails to realize the speeding up of signal output.

Here, if, in order to realize the speeding up of signal output in the two-dimensional MOS solid state imaging device, the technology shown in FIGS. 1 and 2 is adapted, the following problem occurs. That is, in the solid state imaging device shown in FIGS. 1 and 2, to the common signal line A0 to An, signals are outputted sequentially in order of signals (15 signals) of the first pixel, signals (15 signals) of the second pixel, . . . , and signals (15 signals) of the final pixel of each chip (line sensor), so that the signals need to be sorted at the latter stage, which makes the processing circuit at the latter stage complicated. Furthermore, since the line sensors are connected to different output terminals, wirings connecting the line sensors with the output terminals are necessary according to the number of the line sensors, which increases a wiring area. Still further, it is difficult to use the driving method shown in FIG. 2 directly in the two-dimensional MOS solid state imaging device. Therefore, even by using the driving method, the two-dimensional MOS solid state imaging device of the prior art fails to realize the speeding up of signal output.

In view of the above problems, an object of the present invention is to provide a two-dimensional solid state imaging device which can realize speeding up of signal output.

Means to Solve the Problems

In order to achieve the above object, in accordance with an aspect of the present invention, there is provided a solid state imaging device including: a pixel region in which a plurality of pixels are arranged in rows and columns, the plurality of pixels performing photoelectric conversion; a plurality of accumulation elements each of which is arranged for a different column of the pixels and operable to accumulate pixel signals of the column; a plurality of signal lines each of which is connected to a different accumulation element among the plurality of accumulation elements and operable to transmit the pixel signals accumulated in the accumulation element; a common signal line which is connected to the plurality of signal lines and operable to transmit the pixel signals accumulated in the accumulation elements; a readout control unit operable to control readout of the pixel signals from the accumulation element to the signal line; and an output control unit operable to select one of the plurality of signal lines and control output of the pixel signals from the selected signal line to the common signal line, wherein the readout control unit and the output control unit are operable to control the readout and the output of the pixel signals, respectively, so that a time period required for the readout is longer than a time period required for the output.

With the above structure, the solid state imaging device according to the present invention can speed up signal output to the common signal line, while a time period required for readout of pixel signals from an accumulation element such as the capacitance element to the signal line is prolonged and thereby a time period required for stabilizing the pixel signals read out from the accumulation element is ensured. Thereby, it is possible to realize a two-dimensional solid state imaging device which can speed up signal output, while signal output having fidelity to the pixel signals of the accumulation elements is obtained. In addition, the solid state imaging device according to the present invention can speed up signal output to the common signal line, without speeding up the readout from the accumulation element to the signal line, in other words, without forming a scan circuit which performs, at a high speed, readout from all of the capacitance elements to the common signal line. Thereby, it is possible to realize a two-dimensional solid state imaging device which can speed up signal output, while stability of operation is ensured.

It is possible that the readout control unit is operable to control the readout of the pixel signals so that a start timing of the readout is different among the plurality of accumulation elements and that a time period required for the readout is equal among the plurality of accumulation elements, and a delay from a start timing of readout from a predetermined accumulation element to a start timing of another readout from another accumulation element is shorter than the time period required for the readout, the another readout being executed next to the readout from the predetermined accumulation element, or that the readout control unit and the output control unit are operable to control the readout and the output of the pixel signals, respectively, so that the time period required for the output is equal to the delay.

With the above structure, in the solid state imaging device according to the present invention, a time period from readout of pixel signals to the signal line to output of the pixel signals to the common signal line can be set to be equal among the signal lines. Thereby, it is possible to realize a two-dimensional solid state imaging device which can output pixel signals all of which fulfill a stabilization time period.

It is also possible that the readout control unit is operable to control the readout of the pixel signals so that the readouts of the pixel signals from the plurality of accumulation elements can start in an order of arranging the plurality of accumulation elements. It is also possible that the readout control unit includes: a switch arranged between the accumulation elements and the signal line; and a shift register operable to generate a control signal for controlling the switch to be turned on or off.

With the above structure, sorting of the pixel signals at the latter stage becomes unnecessary. Thereby, it is possible to realize a two-dimensional solid state imaging device which can simplify a processing circuit at the latter stage.

It is also possible that each of the plurality of pixels has a color separation function, and each of the plurality of accumulation elements is operable to accumulate a pixel signal generated by performing the photoelectric conversion on light of different color, and that the solid state imaging device further includes a sort unit operable to sort the pixel signals generated by performing the photoelectric conversion on light of different colors to be accumulated into the plurality of accumulation elements, respectively.

With the above structure, it is possible to realize a two-dimensional solid state imaging device which can speed up signal output for different colors.

EFFECTS OF THE INVENTION

According to the solid state imaging device of the present invention, it is possible to realize a two-dimensional solid state imaging device which can speed up signal output. It is also possible to realize a two-dimensional solid state imaging device which can obtain signal output having fidelity to pixel signals of accumulation elements. It is further possible to realize a two-dimensional solid state imaging device which can ensure stability of operation. It is still further possible to realize a two-dimensional solid state imaging device which can speed up signal output for different colors.

Figure 1:
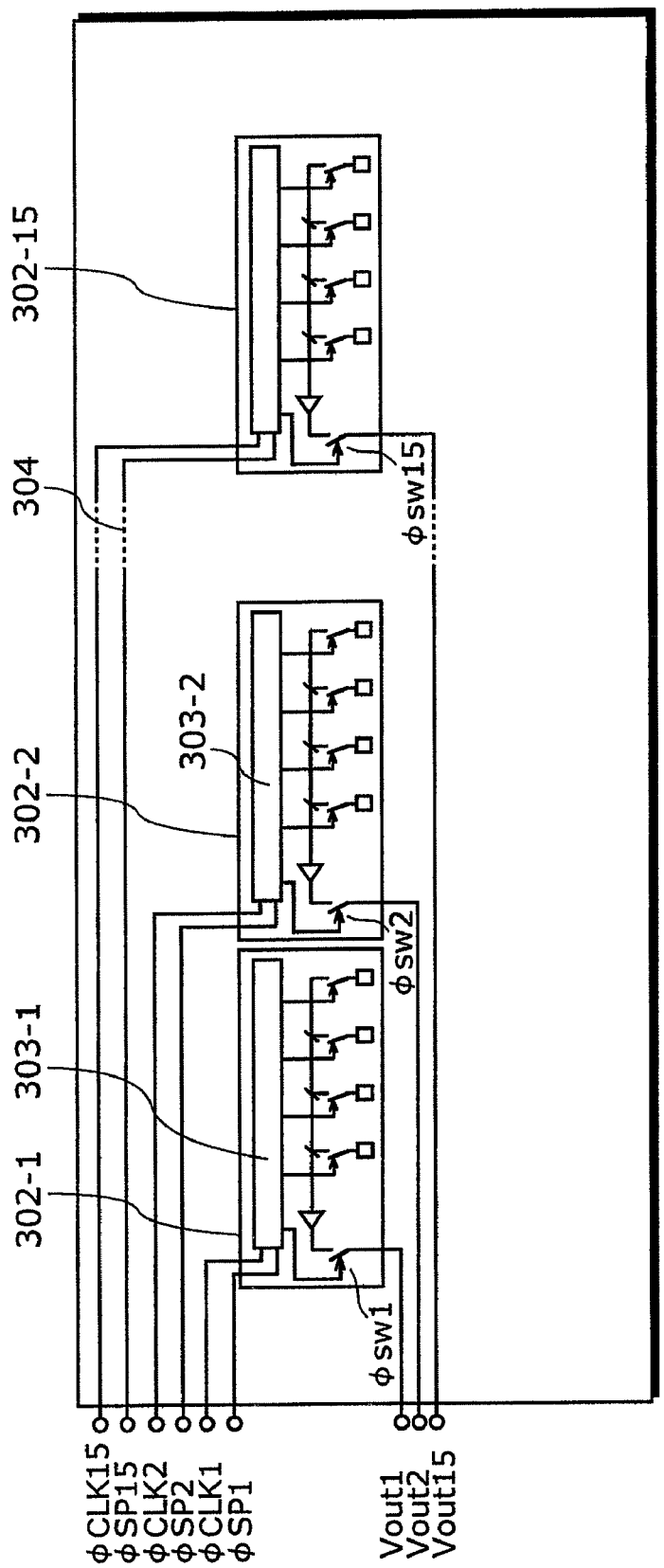
FIG. 1 is a diagram showing a sensor array in a contact multi-chip image sensor which is the solid state imaging device of the prior art.
Figure 2:
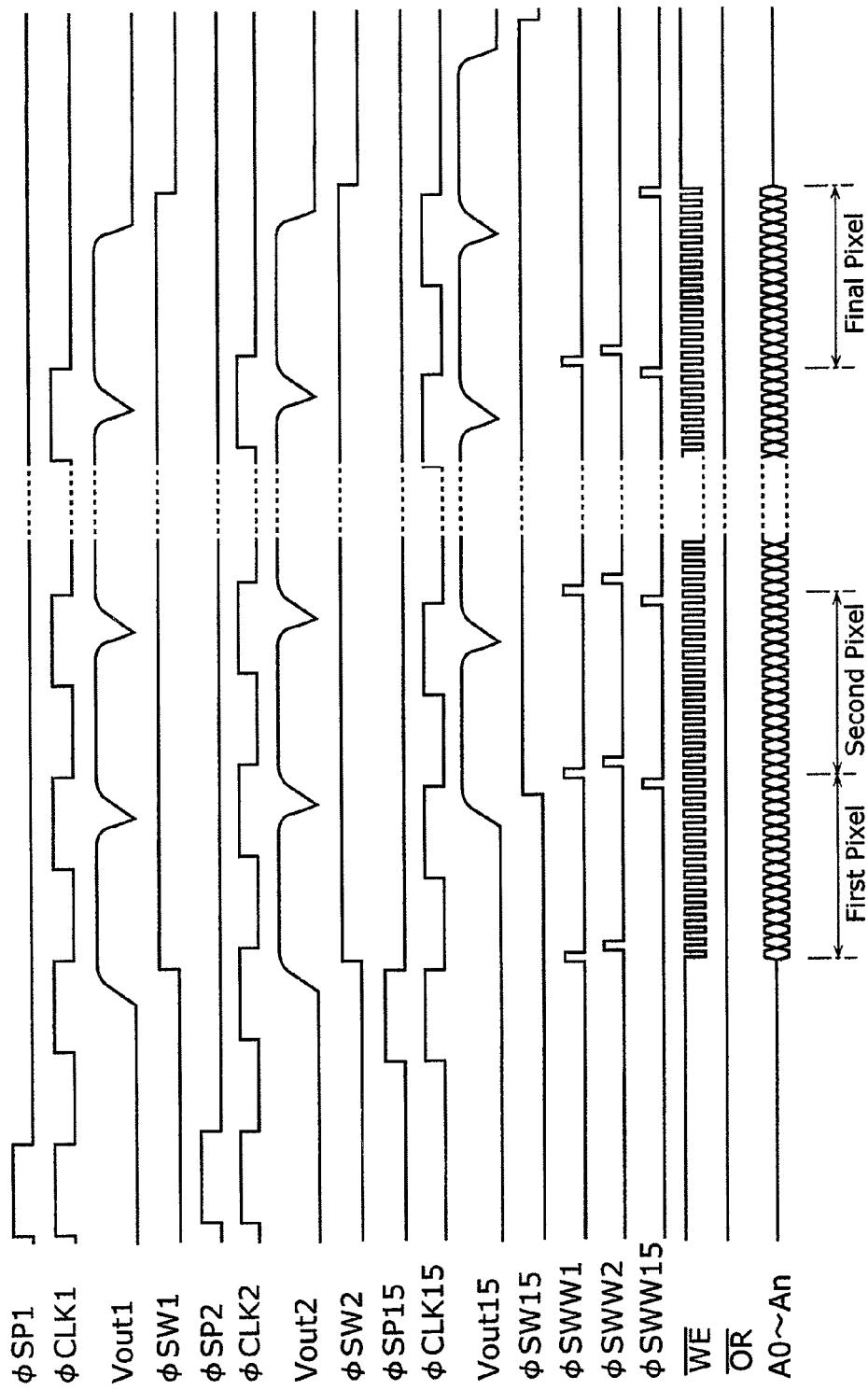
FIG. 2 is a timing chart for explaining operation of the contact multi-chip image sensor of the prior art.

NUMERICAL REFERENCES 1, 101 pixel region
2, 102, 112 accumulation unit
2a, 2e first capacitance element
2b, 2f second capacitance element
2c, 2g third capacitance element
2d, 2h fourth capacitance element
3 horizontal signal line unit
3a first horizontal signal line
3b second horizontal signal line
3c third horizontal signal line
3d fourth horizontal signal line
4 scan timing generation unit
5 external output timing generation unit
6 common signal line
7, 8 switch unit
7a, 7e first transistor
7b, 7f second transistor
7c, 7g third transistor
7d, 7h fourth transistor
8a fifth transistor
8b sixth transistor
8c seventh transistor
8d eighth transistor
10a, 10b, 10c, 10d, 10e, 10f, 10g, 10h stabilization time period
11, 12, 13, 14, 15, 16, 61 shift register
17, 23, 29, 33, 37, 41, 62 scan start terminal
18, 24, 30, 34, 38, 42, 63 clock terminal
19, 20, 21, 22, 25, 26, 27, 28, 31, 32, 35, 36, 39, 40, 43, 44, 64, 65, 66, 67 output terminal
50, 51, 70 drive pulse
52, 71 clock pulse
53, 54, 55, 56, 57, 58, 59, 60, 72, 73, 74, 75 output pulse
110 sort unit
302-1, 302-2, 302-15 line sensor
304 substrate

BEST MODE FOR CARRYING OUT THE INVENTION

The following describes the solid state imaging device according to preferred embodiments of the present invention with reference to the drawings.

FIRST EMBODIMENT

Figure 3:
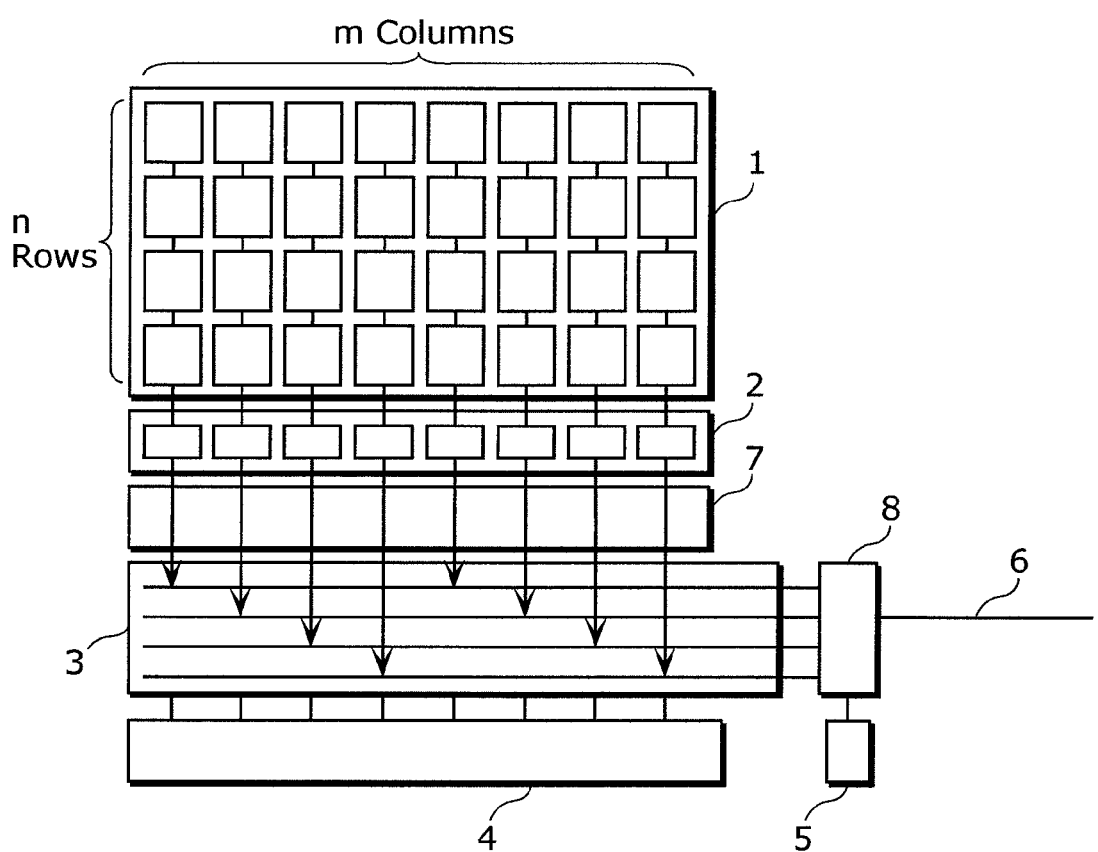
FIG. 3 is a diagram showing a basic circuit structure of a solid state imaging device according to the first embodiment of the present invention.
Figure 4:
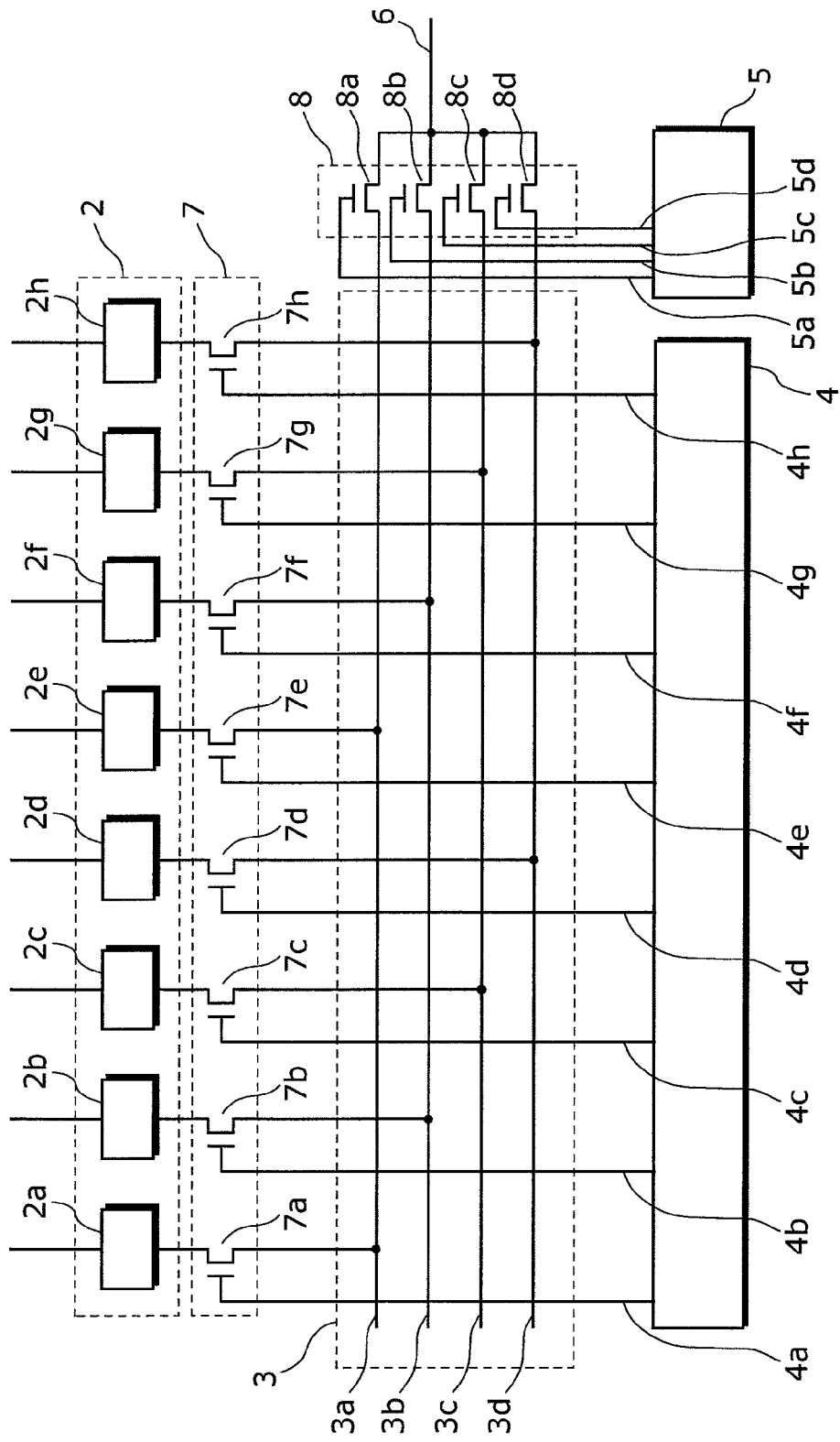
FIG. 4 is a diagram showing a specific circuit structure of the solid state imaging device according to the first embodiment.

FIGS. 3 and 4 show a basic circuit structure of the solid state imaging device according to the first embodiment of the present invention.

The solid state imaging device according to the first embodiment includes a pixel region 1, an accumulation unit 2, a horizontal signal line unit 3, a scan timing generation unit 4, an external output timing generation unit 5, a common signal line 6, a switch unit 7, and a switch unit 8. The pixel region 1 is a region in which a plurality of pixels for performing photoelectric conversion are arranged in n rows and m columns. The accumulation unit 2 includes a plurality of capacitance elements which are arranged for respective columns, and each of which accumulates, per row, pixel signals of the corresponding column of pixels. The horizontal signal line unit 3 includes a plurality of horizontal signal lines which horizontally transmit the pixel signals accumulated in the accumulation unit 2. The scan timing generation unit 4 decides a timing of reading out the pixel signals from the accumulation unit 2 to the horizontal signal line unit 3. The external output timing generation unit 5 decides a timing of outputting the pixel signals from the horizontal signal line to the common signal line 6. The common signal line 6 is connected to the horizontal signal line unit 3, and outputs the pixel signals transmitted by the horizontal signal line to the outside. The switch unit 7 is arranged between the accumulation unit 2 and the horizontal signal line unit 3, and is controlled by the scan timing generation unit 4 to be turned ON/OFF. The switch unit 8 is arranged between the horizontal signal line unit 3 and the common signal line 6, and is controlled by the external output timing generation unit 5 to be turned ON/OFF.

The accumulation unit 2 includes a group of the first capacitance elements 2a and 2e, a group of the second capacitance elements 2b and 2f, a group of the third capacitance elements 2c and 2g, and a group of fourth capacitance elements 2d and 2h, which are sequentially arranged in a direction of rows of the pixels.

The horizontal signal line unit 3 includes the first horizontal signal line 3a, the second horizontal signal line 3b, the third horizontal signal line 3c, and the fourth horizontal signal line 3d. The first horizontal signal line 3a is connected to the first capacitance elements 2a and 2e and transmits pixel signals of the first capacitance elements 2a and 2e. The second horizontal signal line 3b is connected to the second capacitance elements 2b and 2f and transmits pixel signals of the second capacitance elements 2b and 2f. The third horizontal signal line 3c is connected to the third capacitance elements 2c and 2g and transmits pixel signals of the third capacitance elements 2c and 2g. The fourth horizontal signal line 3d is connected to the fourth capacitance elements 2d and 2h and transmits pixel signals of the fourth capacitance elements 2d and 2h.

The switch unit 7 includes the first transistors 7a and 7e, the second transistors 7b and 7f, the third transistors 7c and 7g, the fourth transistors 7d and 7h. The first transistors 7a and 7e are arranged between the first horizontal signal line 3a and the first capacitance elements 2a and 2e, respectively. The second transistors 7b and 7f are arranged between the second horizontal signal line 3b and the second capacitance elements 2b and 2f, respectively. The third transistors 7c and 7g are arranged between the third horizontal signal line 3c and the third capacitance elements 2c and 2g, respectively. The fourth transistors 7d and 7h are arranged between the fourth horizontal signal line 3d and the fourth capacitance elements 2d and 2h, respectively. Here, gates of the first transistors 7a and 7e are connected to signal lines 4a and 4e wired from the scan timing generation unit 4, respectively. Likewise, gates of the second transistors 7b and 7f are connected to signal lines 4b and 4f, respectively, gates of the third transistors 7c and 7g are connected to signal lines 4c and 4g, respectively, and gates of the fourth transistors 7d and 7h are connected to signal lines 4d and 4h, respectively. Therefore, the switch unit 7 and the scan timing generation unit 4 form a readout control unit which controls readout of the pixel signals from the first capacitance elements 2a and 2e to the first horizontal signal line 3a, from the second capacitance elements 2b and 2f to the second horizontal signal line 3b, from the third capacitance elements 2c and 2g to the third horizontal signal line 3c, and from the fourth capacitance elements 2d and 2h to the fourth horizontal signal line 3d.

The switch unit 8 includes the fifth transistor 8a, the sixth transistor 8b, the seventh transistor 8c, and the eighth transistor 8d. The fifth transistor 8a is arranged between the first horizontal signal line 3a and the common signal line 6. The sixth transistor 8b is arranged between the second horizontal signal line 3b and the common signal line 6. The seventh transistor 8c is arranged between the third horizontal signal line 3c and the common signal line 6. The eighth transistor 8d is arranged between the fourth horizontal signal line 3d and the common signal line 6. Here, a gate of the fifth transistor 8a is connected to a signal line 5a wired from the external output timing generation unit 5. Likewise, a gate of the sixth transistor 8b is connected to a signal line 5b, a gate of the seventh transistor 8c is connected to a signal line 5c, and a gate of the eighth transistor 8d is connected to a signal line 5d. Therefore, the switch unit 8 and the external output timing generation unit 5 form an output control unit which selects the first horizontal signal line 3a, the second horizontal signal line 3b, the third horizontal signal line 3c, or the fourth horizontal signal line 3d, and controls output of the pixel signals from the selected horizontal signal line to the common signal line 6.

Figure 5:
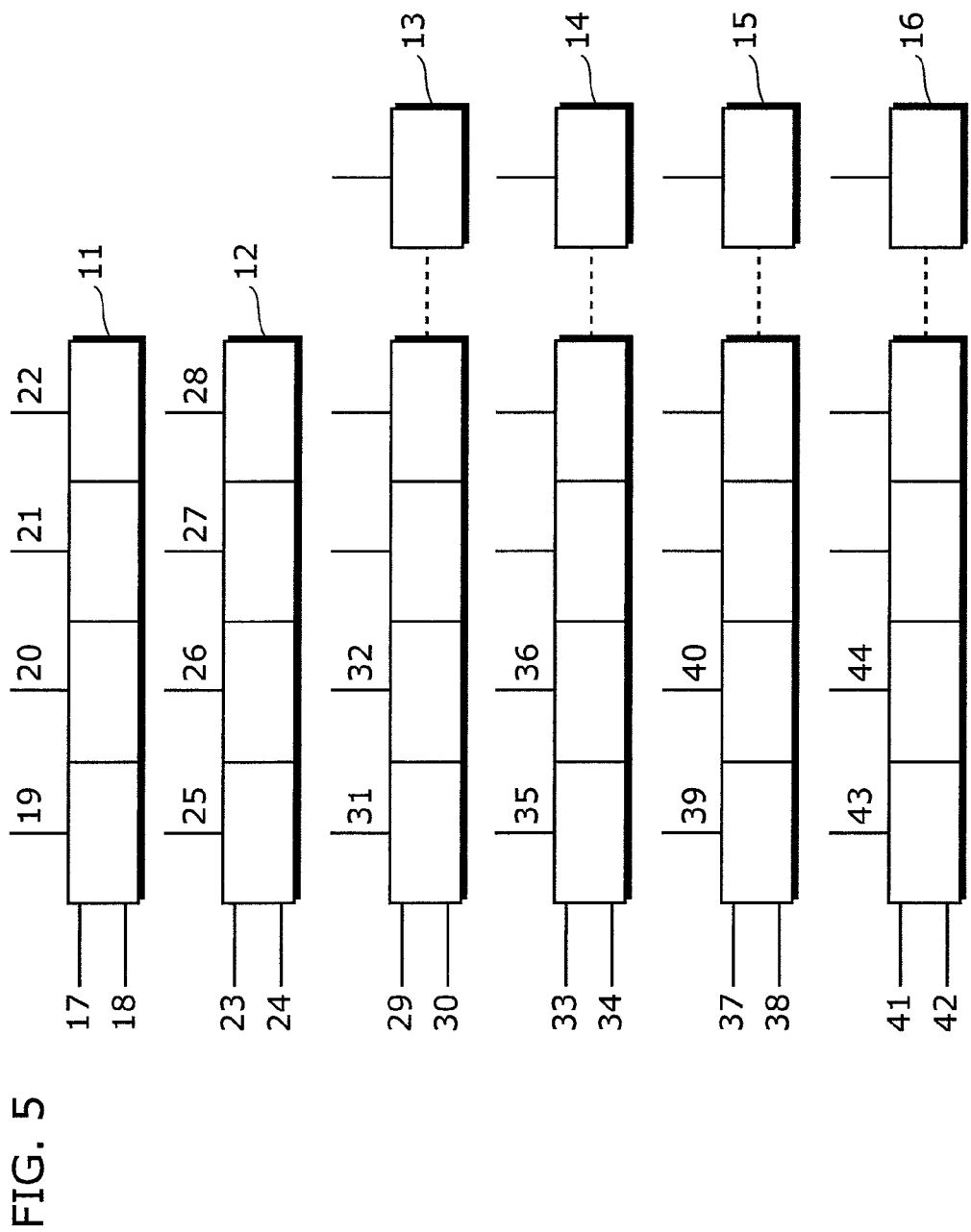
FIG. 5 is a diagram showing a circuit structure of a scan timing generation unit in the solid state imaging device according to the first embodiment.

FIG. 5 is a diagram showing a structure of the scan timing generation unit 4 in detail.

The scan timing generation unit 4 includes shift registers 11, 12, 13, 14, 15, and 16. Output terminals 19, 20, 21, and 22 of the shift register 11 are connected to scan start terminals 29, 33, 37, and 41 of the shift registers 13, 14, 15, and 16, respectively. Output terminals 25, 26, 27, and 28 of the shift register 12 are connected to clock terminals 30, 34, 38, and 42 of the shift registers 13, 14, 15, and 16, respectively. Output terminals 31 and 32 of the shift register 13 are connected to the signal lines 4a and 4e, respectively. Outputs terminals 35 and 36 of the shift register 14 are connected to the signal lines 4b and 4f, respectively. Output terminals 39 and 40 of the shift register 15 are connected to the signal lines 4c and 4g, respectively. Output terminals 43 and 44 of the shift register 16 are connected to the signal lines 4d and 4h, respectively.

Figure 6:
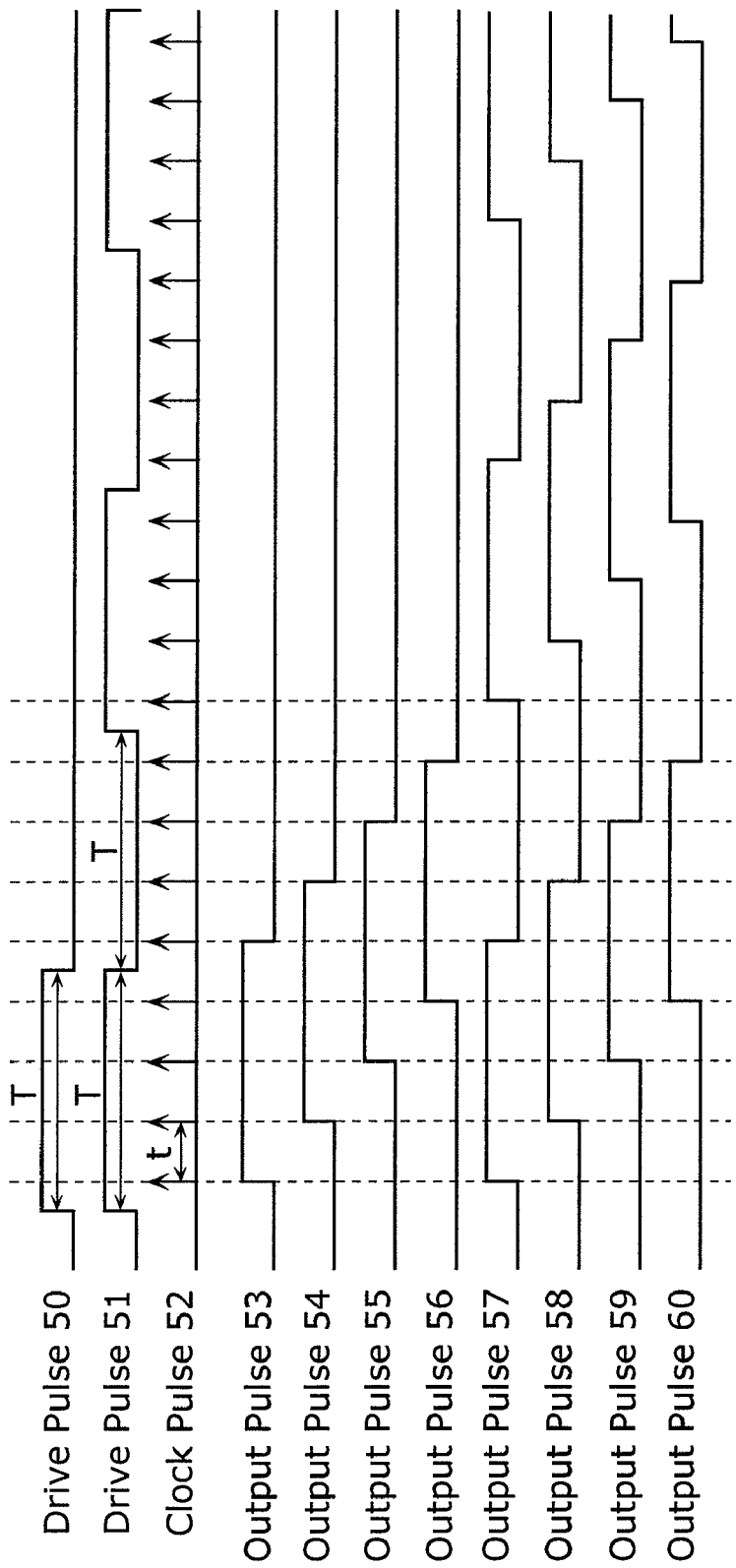
FIG. 6 is a diagram showing waveforms of signals applied to and signals outputted from shift registers which are included in the scan timing generation unit in the solid state imaging device according to the first embodiment.

Here, to the shift registers 11, 12, 13, 14, 15, and 16, pulses as shown in FIG. 6 are applied. More specifically, to a scan start terminal 17 of the shift register 11, a drive pulse 50 which is High only during a time period T is applied, and to a scan start terminal 23 of the shift register 12, a drive pulse 51 which is alternately changed High or Low repeatedly during the time period T. To the clock terminals 18 and 24 of the shift registers 11 and 12, a clock pulse 52, which rises every a time period t which is shorter than the time period T and more specifically one fourth of the time period T, is applied, in order to cause the shift registers 11 and 12 perform shift operation. To scan start terminals 29, 33, 37, and 41 of the shift registers 13, 14, 15, and 16, output pulses 53, 54, 55, and 56 from the output terminals 19, 20, 21, and 22 of the shift register 11 are applied, respectively. To the clock terminals 30, 34, 38, and 42 of the shift registers 13, 14, 15, and 16, output pulses 57, 58, 59, and 60 from the output terminals 25, 26, 27, and 28 of the shift register 12 are applied, respectively. Thereby, to the signal lines 4a to 4h, pulses which are High only during the time period T are sequentially outputted as scan timing signals by being delayed by the time period t, respectively.

Figure 7:
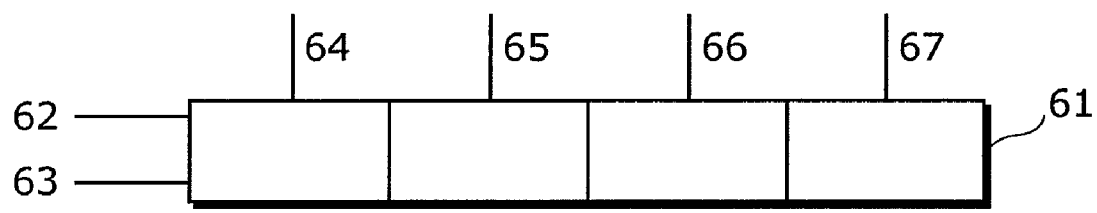
FIG. 7 is a diagram showing a circuit structure of an external output timing generation unit in the solid state imaging device according to the first embodiment.

FIG. 7 is a diagram showing a structure of the external output timing generation unit 5 in detail.

The external output timing generation unit 5 includes a shift register 61. Output terminals 64, 65, 66, and 67 of the shift register 61 are connected to the signal lines 5a, 5b, 5c, and 5d, respectively.

Figure 8:
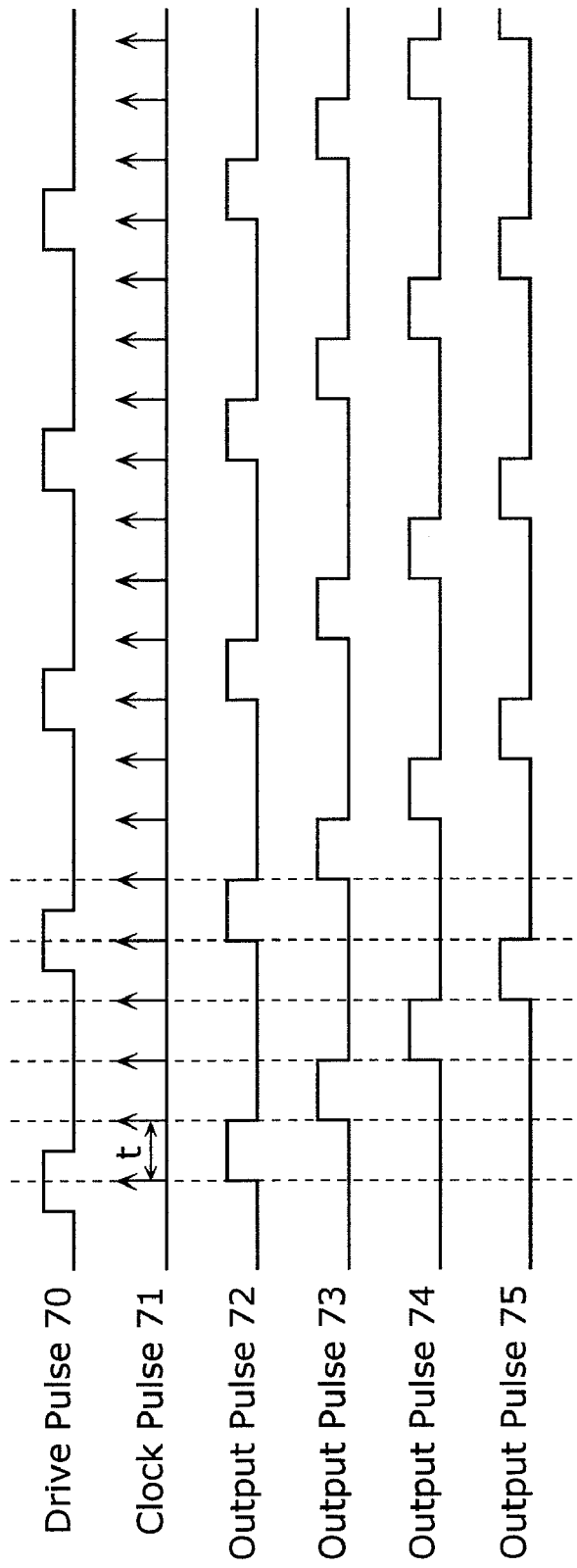
FIG. 8 is a diagram showing waveforms of signals applied to and signals outputted from shift registers which are included in the external output timing generation unit in the solid state imaging device according to the first embodiment.

Here, to a scan start terminal 62 of the shift register 61, as shown in FIG. 8, a drive pulse 70 which becomes High in the time period t after each time period T is applied, and to a clock terminal 63 of the shift register 61, as shown in FIG. 8, a clock pulse 71 which rises every the time period t is applied. Furthermore, to the output terminals 64, 65, 66, and 67 of the shift register 61, as shown in FIG. 8, output pulses 72, 73, 74, and 75 each of which becomes High in the time period t after each time period T are sequentially outputted by being delayed by the time period t, respectively. It should be noted that the clock pulse 71 is the same as the clock pulse 52 of FIG. 6.

Next, operation performed by the solid state imaging device according to the first embodiment having the above-described structure is described.

Figure 9:
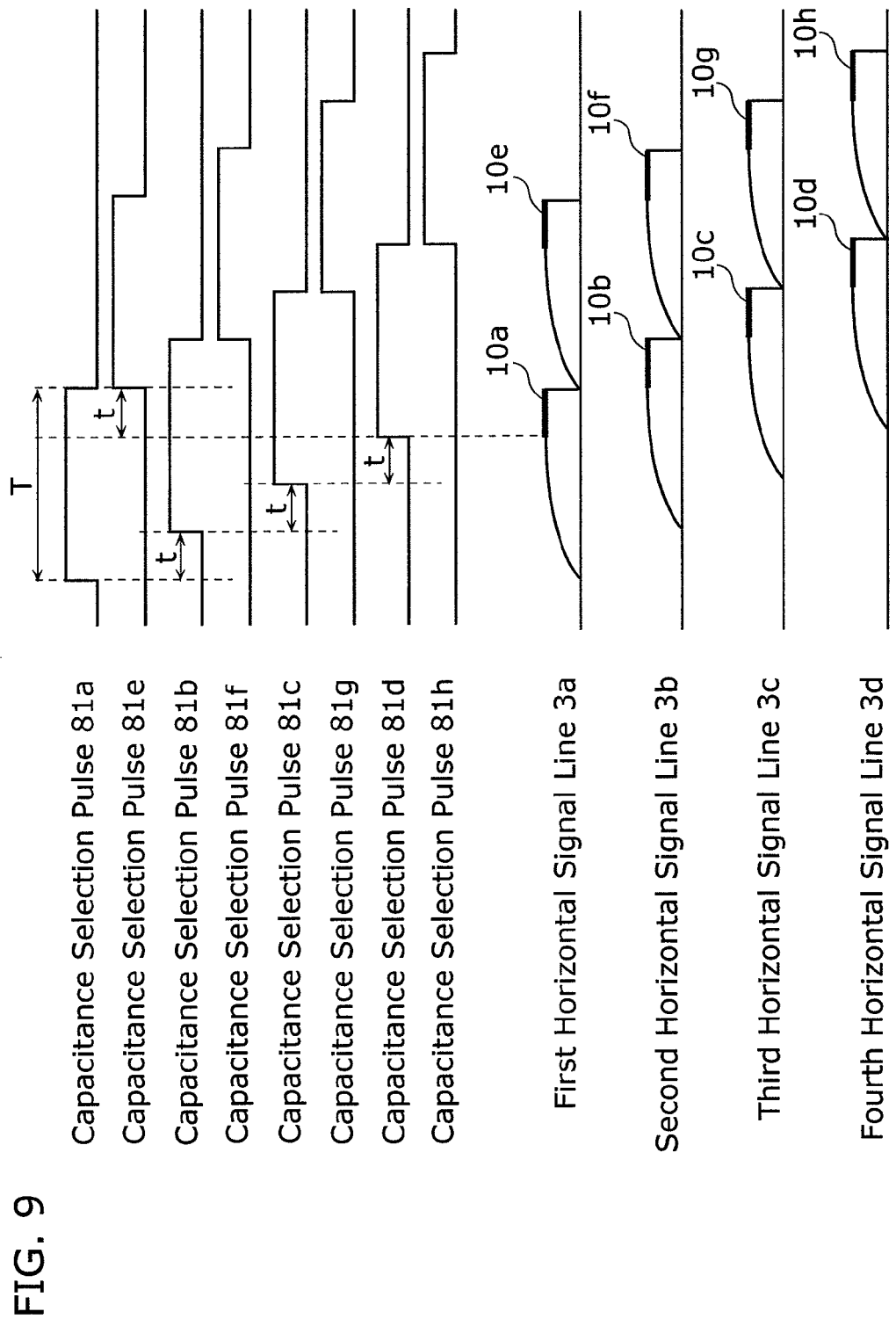
FIG. 9 is a timing chart showing timings of inputting signals from the scan timing generation unit to a switch unit 7 and outputting signals from an accumulation unit to a horizontal signal line unit, in the solid state imaging device according to the first embodiment.
Figure 10:
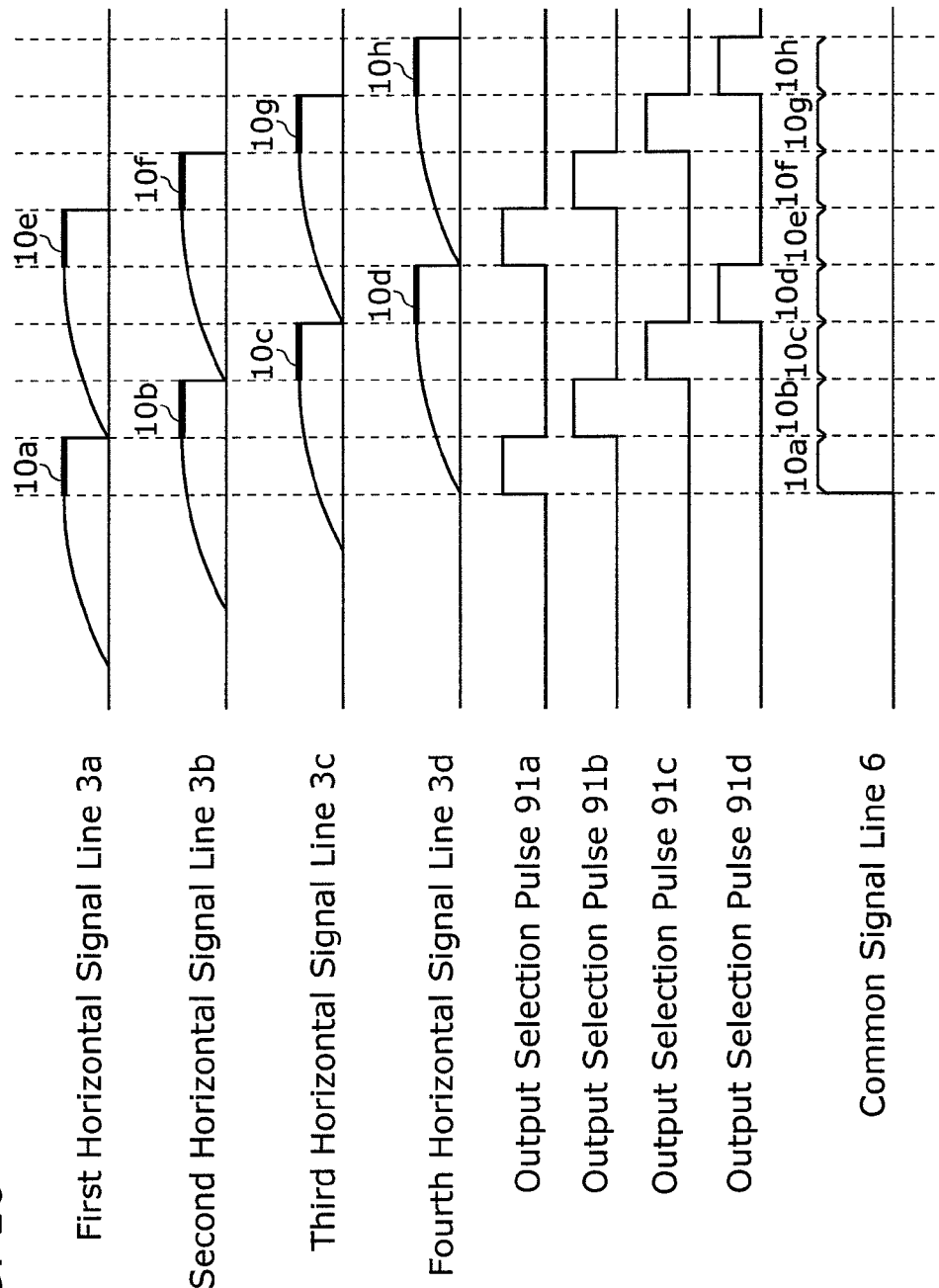
FIG. 10 is a timing chart showing timings of inputting signals from the external output timing generation unit to the switch unit and signals transmitted in the horizontal signal line unit and a common signal line, in the solid state imaging device according to the first embodiment.

FIG. 9 is a timing chart showing timings of inputting signals from the scan timing generation unit 4 to the switch unit 7 and outputting of signals from the accumulation unit 2 to the horizontal signal line unit 3. FIG. 10 is a timing chart showing timings of inputting signals from the external output timing generation unit 5 to the switch unit 8 and signals transmitted in the horizontal signal line unit 3 and the common signal line 6.

Firstly, a capacitance selection pulse 81a for setting the signal line 4a High only during the time period T is applied from the scan timing generation unit 4 (the output terminal 31 of the shift register 13) to a gate of the first transistor 7a. Thereby, the first transistor 7a is turned ON, and the pixel signals accumulated in the first capacitance element 2a are read out to the first horizontal signal line 3a.

Next, a capacitance selection pulse 81b which has a phase delayed only by the time period t from the capacitance selection pulse 81a and sets the signal line 4b High only during the time period T is applied from the scan timing generation unit 4 (the output terminal 35 of the shift register 14) to a gate of the second transistor 7b. Thereby, the second transistor 7b is turned ON, and the pixel signals accumulated in the second capacitance element 2b are read out to the second horizontal signal line 3b.

Then, a capacitance selection pulse 81c which has a phase delayed only by the time period t from the capacitance selection pulse 81b and sets the signal line 4c High only during the time period T is applied from the scan timing generation unit 4 (the output terminal 39 of the shift register 15) to a gate of the third transistor 7c. Thereby, the third transistor 7c is turned ON, and the pixel signals accumulated in the third capacitance element 2c are read out to the third horizontal signal line 3c.

Then, a capacitance selection pulse 81d which has a phase delayed only by the time period t from the capacitance selection pulse 81c and sets the signal line 4d High only during the time period T is applied from the scan timing generation unit 4 (the output terminal 43 of the shift register 16) to a gate of the fourth transistor 7d. Thereby, the fourth transistor 7d is turned ON, and the pixel signals accumulated in the fourth capacitance element 2d are read out to the fourth horizontal signal line 3d.

Then, an output selection pulse 91a which sets the signal line 5a High only during the time period t is applied from the external output timing generation unit 5 (the output terminal 64 of the shift register 61) to a gate of the fifth transistor 8a. Thereby, the fifth transistor 8a is turned ON, and the pixel signals read out to the first horizontal signal line 3a are outputted to the common signal line 6. After that, a capacitance selection pulse 81e which has a phase delayed only by the time period t from the capacitance selection pulse 81d and sets the signal line 4e High only during the time period T is applied from the scan timing generation unit 4 (the output terminal 32 of the shift register 13) to a gate of the first transistor 7e. Thereby, the first transistor 7e is turned ON, and the pixel signals accumulated in the first capacitance element 2e are read out to the first horizontal signal line 3a.

Next, an output selection pulse 91b which sets the signal line 5b High only during the time period t is applied from the external output timing generation unit 5 (the output terminal 65 of the shift register 61) to a gate of the sixth transistor 8b. Thereby, the sixth transistor 8b is turned ON, and the pixel signals read out to the second horizontal signal line 3b are outputted to the common signal line 6. After that, a capacitance selection pulse 81f which has a phase delayed only by the time period t from the capacitance selection pulse 81e and sets the signal line 4f High only during the time period T is applied from the scan timing generation unit 4 (the output terminal 36 of the shift register 14) to a gate of the second transistor 7f. Thereby, the second transistor 7f is turned ON, and the pixel signals accumulated in the second capacitance element 2f are read out to the second horizontal signal line 3b.

Then, an output selection pulse 91c which sets the signal line 5c High only during the time period t is applied from the external output timing generation unit 5 (the output terminal 66 of the shift register 61) to a gate of the seventh transistor 8c. Thereby, the seventh transistor 8c is turned ON, and the pixel signals read out to the third horizontal signal line 3c are outputted to the common signal line 6. After that, a capacitance selection pulse 81g which has a phase delayed only by the time period t from the capacitance selection pulse 81f and sets the signal line 4g High only during the time period T is applied from the scan timing generation unit 4 (the output terminal 40 of the shift register 15) to a gate of the third transistor 7g. Thereby, the third transistor 7g is turned ON, and the pixel signals accumulated in the third capacitance element 2g are read out to the third horizontal signal line 3c.

Finally, an output selection pulse 91d which sets the signal line 5d High only during the time period t is applied from the external output timing generation unit 5 (the output terminal 67 of the output terminal 61) to a gate of the eighth transistor 8d. Thereby, the eighth transistor 8d is turned ON, and the pixel signals read out to the fourth horizontal signal line 3d are outputted to the common signal line 6. After that, a capacitance selection pulse 81h which has a phase delayed only by the time period t from the capacitance selection pulse 81g and sets the signal line 4h High only during the time period T is applied from the scan timing generation unit 4 (the output terminal 44 of the shift register 16) to a gate of the fourth transistor 7h. Thereby, the fourth transistor 7h is turned ON, and the pixel signals accumulated in the fourth capacitance element 2h are read out to the fourth horizontal signal line 3d.

By performing the above-described operation, to the common signal line 6, the pixel signals of the first horizontal signal line 3a, the second horizontal signal line 3b, the third horizontal signal line 3c, and the fourth horizontal signal line 3d are sequentially outputted, and thereby external output signals as shown in FIG. 10 are outputted.

As described above, in the solid state imaging device according to the first embodiment, transmission of the pixel signals from the accumulation unit 2 to the horizontal signal line unit 3 is not performed instantaneously, so that waveforms of the pixel signals which are read out to the first horizontal signal line 3a, the second horizontal signal line 3b, the third horizontal signal line 3c, and the fourth horizontal signal line 3d become waveforms each of which has a time constant and requires a time for rising as shown in FIGS. 9 and 10. Thereby, to the first horizontal signal line 3a, the second horizontal signal line 3b, the third horizontal signal line 3c, and the fourth horizontal signal line 3d, pixel signals which have waveforms fulfilling respective stabilization time periods 10a, 10b, 10c, 10d, 10e, 10f, 10g, and 10h (shown as thick parts in the waveforms in FIGS. 9 and 10) after a predetermined time period, respectively are outputted has passed. Therefore, in general, if a time period required for reading out pixel signals from an accumulation element is short, or if the pixel signals are outputted to the common signal line 6 immediately after starting an readout from an accumulation element, it is not possible to obtain signal output having fidelity to the pixel signals of the accumulation unit 2. However, in the solid state imaging device according to the first embodiment, by starting readout of pixel signals from a capacitance element during another readout of pixel signals from a capacitance element, a time period required for reading out pixel signals from a single capacitance element is prolonged. In addition, by outputting the pixel signals to the common signal line 6 immediately prior to completion of another readout from another capacitance element, a time period from the start of the readout of the pixel signals to the output of the pixel signals is prolonged. As a result, it is possible to obtain signal output having fidelity to the pixel signals of the accumulation unit 2.

Further, in the solid state imaging device according to the first embodiment, a time period, which is equal among a plurality of the accumulation elements, required for reading out pixel signals from the capacitance element to the horizontal signal line (in other words, the time period T) is longer, more specifically four times longer, than a time period required for outputting pixel signals from the horizontal signal line to the common signal line 6 (in other words, the time period t). Thereby, output of the pixel signals can be obtained every the time period t which is one fourth of the time period T of the scan timing, so that it is possible to realize signal output which is four times faster than the scan timing. Accordingly, it is possible to realize a two-dimensional solid state imaging device which can speed up signal output.

Still further, in the solid state imaging device according to the first embodiment, a delay from a timing of start (a start timing) of readout from a predetermined capacitance element to a timing of start (a start timing) of readout from another capacitance element for which the readout is performed next to the predetermined capacitance element, in other words, a time period of a delay (a delay period) of each horizontal signal line (each capacitance element) between timings of readouts of pixel signals from the capacitance elements to the horizontal signal lines is shorter than a time period required for readout of pixel signals from a single capacitance element, and is the time period t that is equal to a time period required for output of pixel signals from a single horizontal signal line to the common signal line 6. Thereby, a time period required from readout of pixel signals to a horizontal signal line to output of the pixel signals to the common signal line 6 can be set to be equal among sets of the pixel signals. As a result, the solid state imaging device according to the first embodiment can output pixel signals all of which fulfill their stabilization time periods.

Still further, in the solid state imaging device according to the first embodiment, readouts of pixel signals from the first capacitance elements 2a and 2e, the second capacitance elements 2b and 2f, the third capacitance element 2c and 2g, and the fourth capacitance elements 2d and 2h, which are sequentially arranged in a direction of rows, to the first horizontal signal line 3a, the second horizontal signal line 3b, the third horizontal signal line 3c, and the fourth horizontal signal line 3d, respectively, are started in an order of arranging of the capacitance elements in the direction of the rows. Thereby, sorting of the pixel signals at a latter stage or the like becomes unnecessary, which makes it possible to simplify a processing circuit at the latter stage.

Second Embodiment

Figure 11:
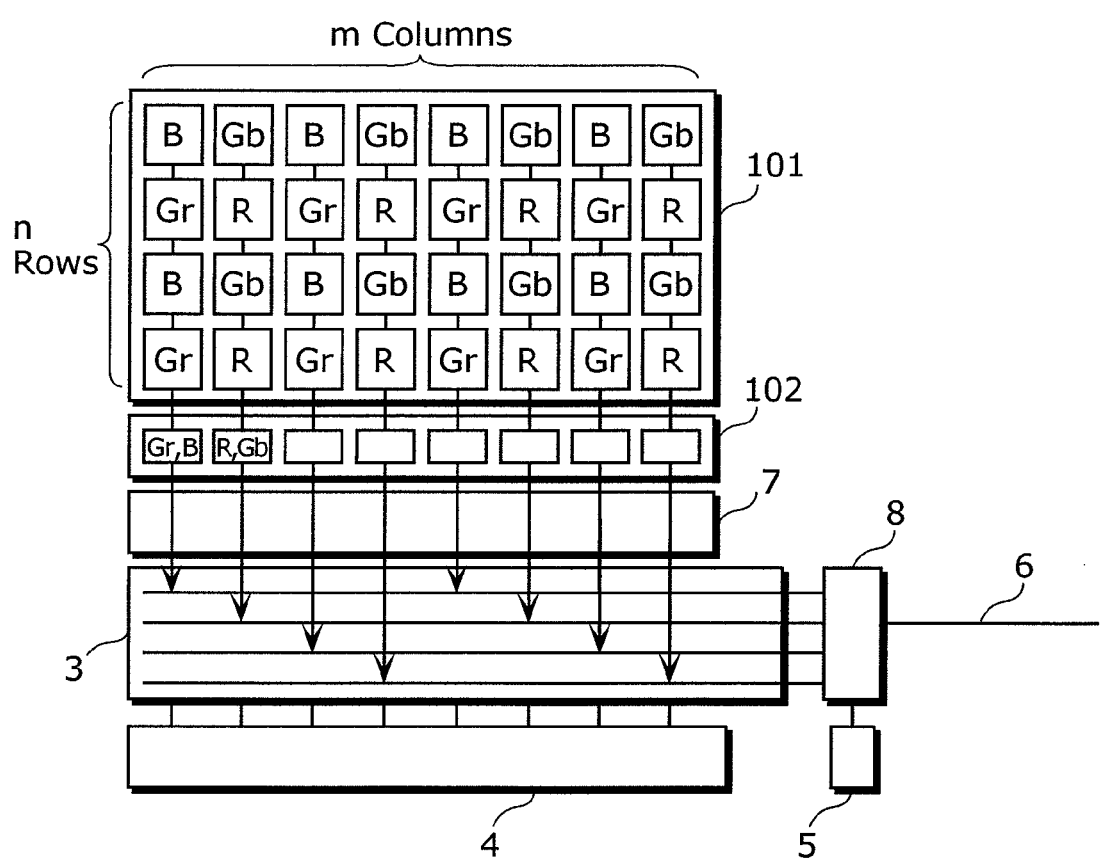
FIG. 11 is a diagram showing a basic circuit structure of a solid state imaging device according to the second embodiment of the present invention.

FIG. 11 is a diagram showing a basic circuit structure of a solid state imaging device according to the second embodiment of the present invention. The following describes mainly aspects different from the solid state imaging device of the first embodiment.

In this solid state imaging device of the second embodiment, a pixel region 101 includes a plurality of pixels each having a color separation function. In more detail, the pixel region 101 includes pixels for which a color filter having a light incident surface on which four colors (R, Gr, Gb, B) are arranged in the Bayer color filter array pattern is formed.

In addition, a first capacitance element and a third capacitance element, and a second capacitance element and a fourth capacitance element in an accumulation unit 102 accumulate pixel signals generated by performing photoelectric conversion on light of different colors. More specifically, the first capacitance element and the third capacitance element accumulate pixel signals generated by performing photoelectric conversion on light of Gr and B, and the second capacitance element and the fourth capacitance element accumulate pixel signals generated by performing photoelectric conversion on light of Gb and R. Thereby, the first horizontal signal line and the third horizontal signal line of the horizontal signal line unit 3 transmit the pixel signals generated by performing photoelectric conversion on light of Gr and B, and the second horizontal signal line and the fourth horizontal signal line of the horizontal signal line unit 3 transmit the pixel signals generated by performing photoelectric conversion on light of Gb and R.

In the solid state imaging device having the above-described structure, the pixel signals generated by performing photoelectric conversion on Gr and B are read out from pixels in the second row of the pixel region 101, and then accumulated in respective capacitance elements in the accumulation unit 102. In more detail, pixel signals generated by performing photoelectric conversion on light of Gr are accumulated in the first capacitance element and the third capacitance element, and pixel signals generated by performing photoelectric conversion on light of R are accumulated in the second capacitance element and the fourth capacitance element. After that, signal output to the common signal line 6 is performed at a high speed, in an order of the pixel signals generated by performing photoelectric conversion on light of Gr and then the pixel signals generated by performing photoelectric conversion on light of R.

Subsequently, the pixel signals generated by performing photoelectric conversion on light of B and Gb are read out from pixels in the third row of the pixel region 101, and accumulated in the respective capacitance elements of the accumulation unit 102. In more detail, pixel signals generated by performing photoelectric conversion on light of B are accumulated in the first capacitance element and the third capacitance element, and pixel signals generated by performing photoelectric conversion on light of Gb are accumulated in the second capacitance element and the fourth capacitance element. After that, signal output to the common signal line 6 is performed at a high speed, in an order of the pixel signals generated by performing photoelectric conversion on light of B and then the pixel signals generated by performing photoelectric conversion on light of Gb. Thereby, a pattern of the signal output to the common signal line 6 is repetition of an order of Gr, R, Gr, R, Gr, R, ... of the second row, and then B, Gb, B, Gb, B, Gb, ... of the third row.

Third Embodiment

Figure 12:
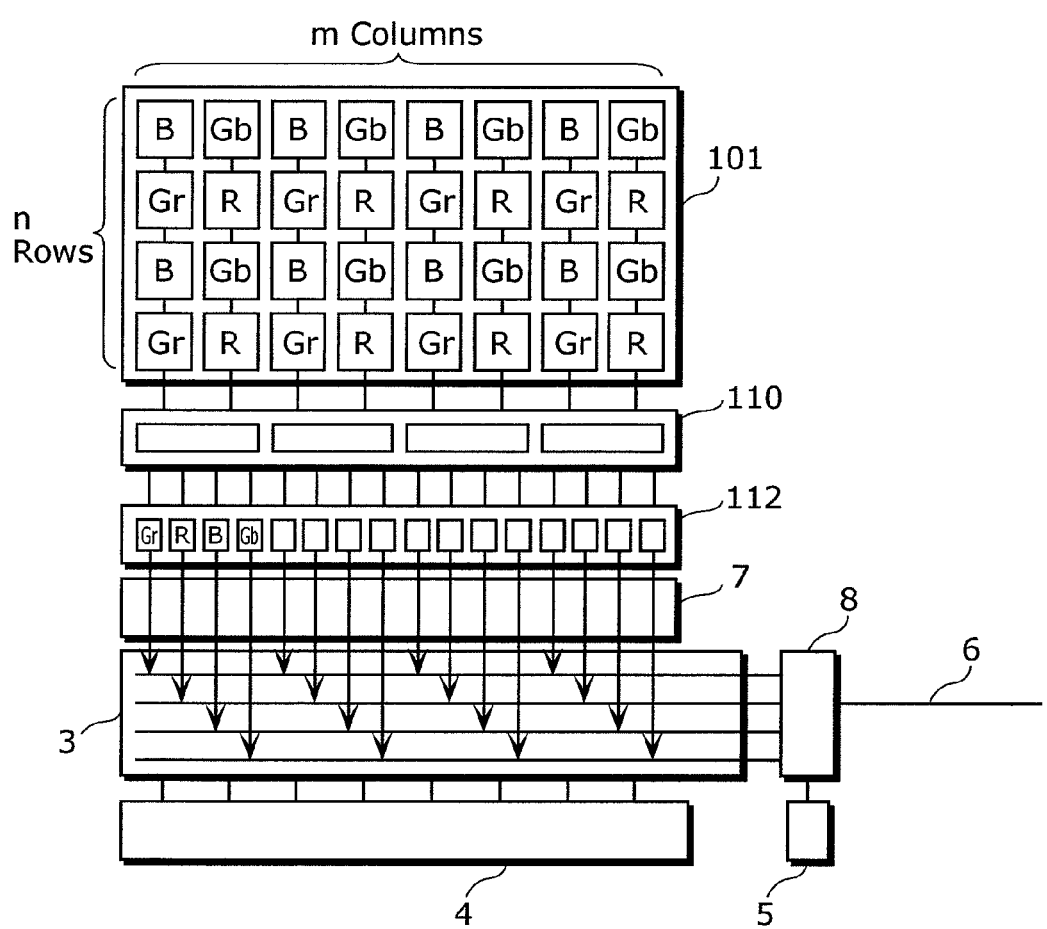
FIG. 12 is a diagram showing a basic circuit structure of a solid state imaging device according to the third embodiment of the present invention.

FIG. 12 is a diagram showing a basic circuit structure of a solid state imaging device according to the third embodiment of the present invention. The following describes mainly aspects different from the solid state imaging device of the first embodiment.

In this solid state imaging device of the third embodiment, the pixel region 101 includes a plurality of pixels each having a color separation function. In more detail, the pixel region 101 includes pixels for which a color filter having a light incident surface on which four colors (R, Gr, Gb, B) are arranged in the Bayer color filter array pattern is formed.

In addition, a first capacitance element, a second capacitance element, a third capacitance element, and a fourth capacitance element in an accumulation unit 112 accumulate pixel signals generated by performing photoelectric conversion on light of different colors. In more detail, the first capacitance element accumulates pixel signals generated by performing photoelectric conversion on light of Gr, the second capacitance element accumulates pixel signals generated by performing photoelectric conversion on light of R, the third capacitance element accumulates pixel signals generated by performing photoelectric conversion on light of B, and the fourth capacitance element accumulates pixel signals generated by performing photoelectric conversion on light of Gb. Thereby, in the horizontal signal line unit 3, the first horizontal signal line transmits the pixel signals generated by performing photoelectric conversion on light of Gr, the second horizontal signal line transmits the pixel signals generated by performing photoelectric conversion on light of R, the third horizontal signal line transmits the pixel signals generated by performing photoelectric conversion on light of B, and the fourth horizontal signal line transmits the pixel signals generated by performing photoelectric conversion on light of Gb.

Furthermore, between the pixel region 101 and the accumulation unit 112, a selection unit 100 is formed to sort pixel signals so that the pixel signals generated by performing photoelectric conversion on light of Gr can be accumulated in the first capacitance element, the pixel signals generated by performing photoelectric conversion on light of R can be accumulated in the second capacitance element, the pixel signals generated by performing photoelectric conversion on light of B can be accumulated in the third capacitance element, and the pixel signals generated by performing photoelectric conversion on light of Gb can be accumulated in the fourth capacitance element.

Still further, between the pixel region 101 and the accumulation unit 112, a sort unit 110 having a signal switching function is formed to sort the pixel signals so that the pixel signals generated by performing photoelectric conversion on light of Gr can be accumulated in the first capacitance element, the pixel signals generated by performing photoelectric conversion on light of R can be accumulated in the second capacitance element, the pixel signals generated by performing photoelectric conversion on light of B can be accumulated in the third capacitance element, and the pixel signals generated by performing photoelectric conversion on light of Gb can be accumulated in the fourth capacitance element.

In the solid state imaging device having the above-described structure, pixel signals generated by performing photoelectric conversion on light of Gr, R, B, and Gb are readout from pixels in the second and third rows of the pixel region 101, namely, from pixels in totally two rows, then sorted by the sort unit 110, and eventually accumulated in respective capacitance elements of the accumulation unit 112. In more detail, the pixel signals generated by performing photoelectric conversion on light of Gr are accumulated in the first capacitance element, the pixel signals generated by performing photoelectric conversion on light of R are accumulated in the second capacitance element, the pixel signals generated by performing photoelectric conversion on light of B are accumulated in the third capacitance element, and the pixel signals generated by performing photoelectric conversion on light of Gb are accumulated in the fourth capacitance element. After that, signal output to the common signal line 6 is performed at a high speed, in an order of the pixel signals generated by performing photoelectric conversion on light of Gr, the pixel signals generated by performing photoelectric conversion on light of R, the pixel signals generated by performing photoelectric conversion on light of B, and then the pixel signals generated by performing photoelectric conversion on light of Gb. Thereby, a pattern of the signal output to the common signal line 6 is repetition of an order of Gr, R, B, Gb, . . . .

Although only some exemplary embodiments of the solid state imaging device according to the present invention have been described in detail above, the present invention is not limited to these embodiments. Accordingly, those skilled in the art will be readily appreciated that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention is useful as a solid state imaging device, and more particularly as a two-dimensional MOS solid state imaging device for which high-speed signal readout is required.

The invention claimed is:

1. A solid state imaging device, comprising:
a pixel region in which a plurality of pixels are arranged in rows and columns, the plurality of pixels performing photoelectric conversion;
a plurality of accumulation elements each of which is arranged for a different column of the pixels and operable to accumulate pixel signals of the column;
a plurality of signal lines each of which is connected to a different accumulation element among said plurality of accumulation elements and operable to transmit the pixel signals accumulated in said accumulation element;
a common signal line which is connected to said plurality of signal lines and operable to transmit the pixel signals accumulated in said accumulation elements;
a readout control unit operable to control readout of the pixel signals from said accumulation element to said signal line; and
an output control unit operable to select one of said plurality of signal lines and control output of the pixel signals from said selected signal line to said common signal line,
wherein said readout control unit and said output control unit are operable to control the readout and the output of the pixel signals, respectively, so that a time period required for the readout is longer than a time period required for the output,
wherein said readout control unit is operable to control the readout of the pixel signals so that a start timing of the readout is different among said plurality of accumulation elements and that a time period required for the readout is equal among said plurality of accumulation elements,
wherein a delay from a start timing of readout from a predetermined accumulation element to a start timing of another readout from another accumulation element is shorter than the time period required for the readout, the another readout being executed next to the readout from the predetermined accumulation element, and
wherein said readout control unit and said output control unit are operable to control the readout and the output of the pixel signals, respectively, so that the time period required for the output is equal to the delay.

2. The solid state imaging device according to Claim 1, wherein said readout control unit is operable to control the readout of the pixel signals so that the readouts of the pixel signals from said plurality of accumulation elements can start in an order of arranging said plurality of accumulation elements.

3. The solid state imaging device according to claim 2, wherein said readout control unit includes: a switch arranged between said accumulation elements and said signal line; and a shift register operable to generate a control signal for controlling the switch to be turned on or off.

4. The solid state imaging device according to Claim 1, wherein each of said plurality of pixels has a color separation function, and
each of said plurality of accumulation elements is operable to accumulate a pixel signal generated by performing the photoelectric conversion on light of different color.

5. The solid state imaging device according to claim 4, further comprising
a sort unit operable to sort the pixel signals generated by performing the photoelectric conversion on light of different colors to be accumulated into said plurality of accumulation elements, respectively.

* * * * *